US012657956B2

(12) United States Patent
Fujimoto et al.

(10) Patent No.: US 12,657,956 B2
(45) Date of Patent: Jun. 16, 2026

(54) ACTION SERIES DETERMINATION DEVICE, METHOD, AND NON-TRANSITORY RECORDING MEDIUM

(71) Applicant: Fujitsu Limited, Kawasaki (JP)

(72) Inventors: Junya Fujimoto, Atsugi (JP); Osafumi Nakayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 315 days.

(21) Appl. No.: 18/341,566

(22) Filed: Jun. 26, 2023

(65) Prior Publication Data

US 2023/0377374 A1 Nov. 23, 2023

Related U.S. Application Data

(63) Continuation of application No. PCT/JP2021/002816, filed on Jan. 27, 2021.

(51) Int. Cl.
*G06T 7/70* (2017.01)
*G06V 10/44* (2022.01)
(Continued)

(52) U.S. Cl.
CPC .............. *G06V 40/20* (2022.01); *G06T 7/70* (2017.01); *G06V 10/44* (2022.01); *G06V 20/49* (2022.01); *G06T 2207/30196* (2013.01)

(58) Field of Classification Search
CPC ........ G06V 40/20; G06V 20/49; G06V 10/44; G06V 40/23; G06T 7/70; G06T 2207/30196; G06N 7/01; G06N 20/00
See application file for complete search history.

(56) References Cited

U.S. PATENT DOCUMENTS

2010/0027835 A1* 2/2010 Zhang ................ G06V 30/1988
382/100
2012/0123733 A1* 5/2012 Lo ............................ A61B 5/11
702/141
(Continued)

FOREIGN PATENT DOCUMENTS

JP 2009-205282 A 9/2009
JP 2020-038440 A 3/2020
(Continued)

OTHER PUBLICATIONS

"Real-time Audio to Score Alignment Using a Hybrid Hidden Semi-Markov Model and Linear Dynamical System" by Ryuichi Yamamoto, Shinji Sako, and Tadashi Kitamura, Proceedings of the International Society for Music Information Retrieval (MUS) 2012.
(Continued)

*Primary Examiner* — Syed Haider
(74) *Attorney, Agent, or Firm* — ArentFox Schiff LLP

(57) ABSTRACT

From plural observation features of a time series acquired by observing movements of a person, plural candidate segments are decided of a target action series containing plural respective actions expressing plural movements. Each of the plural candidate segments is divided into each action segment that is a time segment of the action, a likelihood corresponding to each of the plural actions computed for each of the action segments is normalized by action segment, and as an evaluation value a representative value is computed of normalized likelihood corresponding to each of the action segments selected from out of all of the respective action segments in the candidate segments based on an order of actions in the target action series. Being the target action series is determined in cases in which the evaluation value exceeds a common threshold.

12 Claims, 23 Drawing Sheets

(51) Int. Cl.
G06V 20/40 (2022.01)
G06V 40/20 (2022.01)

(56) References Cited

U.S. PATENT DOCUMENTS

| | | | |
|---|---|---|---|
| 2016/0005280 A1* | 1/2016 | Laska | .............. G08B 13/19608 |
| | | | 386/230 |
| 2017/0277941 A1 | 9/2017 | Smith | |
| 2019/0220657 A1* | 7/2019 | Yabuki | ................. G06V 40/103 |
| 2020/0387715 A1 | 12/2020 | Hasegawa et al. | |

FOREIGN PATENT DOCUMENTS

| | | |
|---|---|---|
| WO | WO 2018/047863 A1 | 3/2018 |
| WO | WO 2019/167775 A1 | 9/2019 |
| WO | WO 2020/050111 A1 | 3/2020 |

OTHER PUBLICATIONS

"Hidden Semi-Markov Models" by Shun-Zheng Yu in Artificial Intelligence, vol. 174, Issue 2, Feb. 2010, pp. 215 to 243.
"Efficient Parameter Estimation for Hierarchical Hidden Markov Models" by Kei Wakabayashi and Takao Miura, Transactions of Institute of Electronics, Information and Communication Engineers 2011.
"Fujitsu Develops New "Actlyzer" AI Technology for Video-Based Behavioral Analysis", (online), Nov. 25, 2019, Fujitsu Limited (accessed Jan. 19, 2021), Internet (https://pr.fujitsu.com/jp/news/2019/11/25.html).
Matsubara, Yasuko et al. "Stream Processing through Hidden Markov Models", Information Processing Society of Japan, vol. 4, No. 4, pp. 48 to 62, Dec. 2011.
International Search Report issued in International Application No. PCT/JP2 021/002816 on Apr. 27, 2021.
Extended European Search Report issued by the European Patent Office in European Application No. 21922805 mailed dated Nov. 29, 2023.
Office Action issued by the European Patent Office in European Application No. 21922805.3, dated Nov. 10, 2025.

\* cited by examiner (1) RAISE ARM
(2) LOWER ARM
(3) EXTEND ARM FORWARD
(4) BRING BOTH HANDS
    CLOSE TOGETHER
    IN FRONT OF BODY
(5) MOVE FORWARD
(6) MOVE SIDEWAYS
(7) SQUAT
(8) STAND a31

(1)⇨(3)⇨(1)⇨(4)⇨(7)

a32

(7)⇨(4)⇨(8)⇨(5)⇨(3)

1

ACTION SERIES DETERMINATION DEVICE, METHOD, AND NON-TRANSITORY RECORDING MEDIUM

CROSS-REFERENCE TO RELATED APPLICATION

This application is a continuation application of International Application No. PCT/JP2021/002816, filed on Jan. 27, 2021, the disclosure of which is incorporated herein by reference in its entirety.

FIELD

The present disclosure relates to an action series determination device, an action series determination method, and an action series determination program.

BACKGROUND

Recognition of postures from a video of a person imaged with a normal RGB camera has become possible due to progresses in deep learning technology, and various research and development is being performed into estimating actions of a person utilizing such recognition information. Under such circumstances, effort is being put into estimating time segments where a specified action occurred from time series data of postures detected in people videos.

RELATED ART DOCUMENTS

Non-Patent Documents

Non-Patent Document 1: "Real-time Music Audio Signal to Score Alignment Using a Hybrid Hidden Semi-Markov Model and Linear Dynamical System" by Ryuichi YAMAMOTO, Shinji SAKO, and Tadashi KITAMURA, Proceedings of the International Society for Music Information Retrieval (MUS) 2012.
Non-Patent Document 2: "Hidden Semi-Markov Models" by Shun-Zheng Yu in Artificial Intelligence, Volume 174, Issue 2, February 2010, pages 215 to 243.
Non-Patent Document 3: "Efficient Parameter Estimation for Hierarchical Hidden Markov Models" by Kei WAKA-BAYASHI and Takao MIURA in transactions of Institute of Electronics, Information and Communication Engineers 2011.
Non-Patent Document 4: "Fujitsu Develops New "Actlyzer" AI Technology for Video-Based Behavioral Analysis", (online), Nov. 25, 2019, Fujitsu Limited (accessed Jan. 19, 2021), Internet (URL: https://pr.fujitsu.com/jp/news/2019/11/25.html).

SUMMARY

In one exemplary embodiment, from plural observation features of a time series acquired by observing movements of a person, plural candidate segments are decided of a target action series containing plural respective actions expressing plural movements. Each of the plural candidate segments is divided into each action segment that is a time segment of the action, and a likelihood corresponding to each of the plural actions computed for each of the action segments is normalized by action segment. A representative value of normalized likelihood corresponding to each of the action segments selected from out of all of the respective action segments in the candidate segments is computed as an evaluation value based on an order of actions of the target action series. Being the target action series is determined in cases in which the evaluation value exceeds a common threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
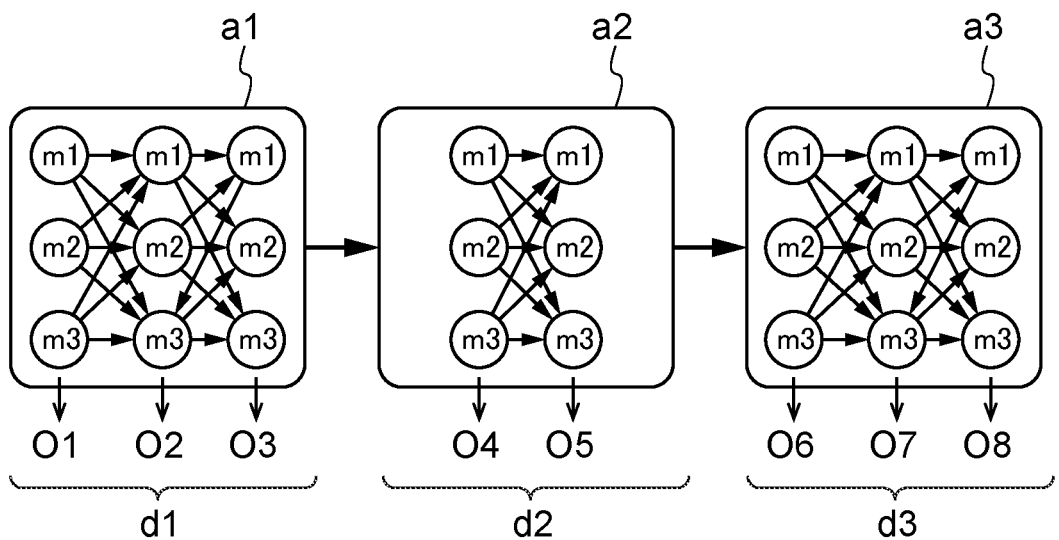
FIG. 1 is a schematic diagram illustrating an example of a hidden semi-Markov model of the present exemplary embodiment.

In the present exemplary embodiment, a hidden semi-Markov model (hereafter referred to as HSMM) such as that illustrated in FIG. 1 is built as an example of an action segment estimation model for estimating time segments in which an action of a person occurs. An HSMM has, in addition to the parameters of a hidden Markov model (hereafter referred to as HMM), a probability distribution of successive durations as parameters for each state.

The HSMM of the present exemplary embodiment includes plural first HMMs employing each movement of a person as states, and a second HMM employing actions as states. m1, m2, m3 are examples of movements, and a1, a2, a3 are examples of actions. An action is a combination of plural movements, and a movement is a combination of plural postures.

When time series sensor data generated by detecting postures of a person is given to an HSMM built by setting parameters, the HSMM estimates optimal action time segments (hereafter referred to as action segments). d1, d2, d3 are examples of action segments.

Observation probabilities and transition probabilities are present in the parameters of an HMM. O1, . . . , O8 are examples of observation probabilities, and transition probabilities are the probabilities corresponding to arrows linking states. The observation probabilities are probabilities that a given feature is observed in each state, and the transition probabilities are the probabilities of transitioning from a given state to another state. Transition probabilities are not needed for cases in which an order of transition is determined. Note that the number of movements and the number of actions, namely the number of the first HMMs and the number of second HMMs, are merely examples thereof, and are not limited to the numbers of the example illustrated in FIG. 1.

Figure 2:
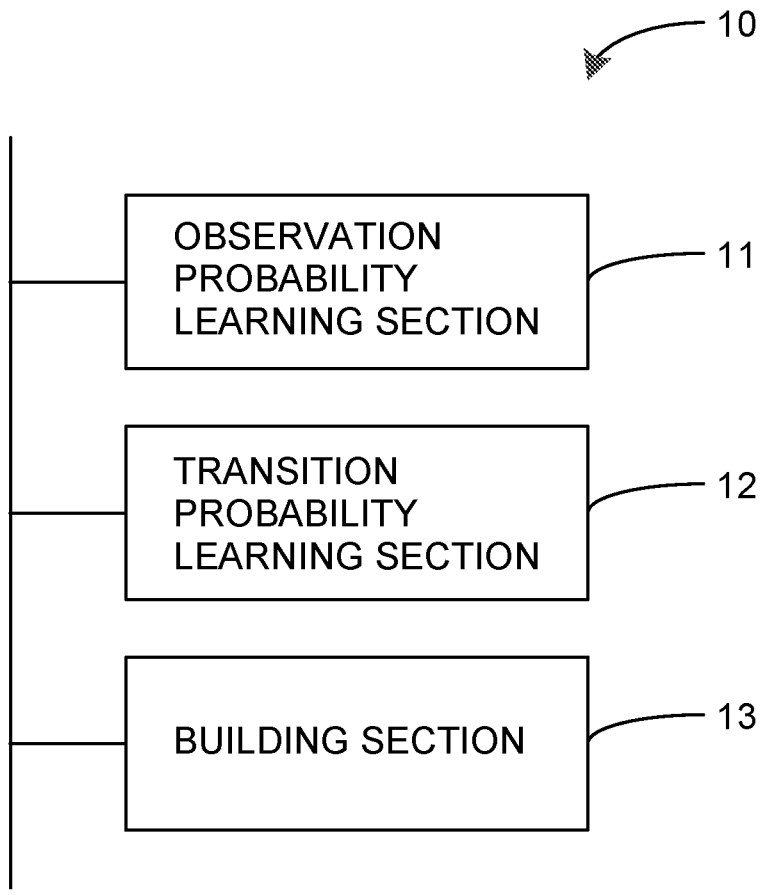
FIG. 2 is a block diagram illustrating an example of a functional configuration of an action segment estimation model building device of the present exemplary embodiment.

FIG. 2 is an example of a functional block diagram of an action segment estimation model building device 10 of the present exemplary embodiment. The action segment estimation model building device 10 includes an observation probability learning section 11, a transition probability learning section 12, and a building section 13. The observation probability learning section 11, as described below, uses unsupervised data to learn observation probabilities of an HSMM, which is an example of an action segment estimation model.

A target of the present exemplary embodiment is an action limited to achieving a given task goal. Such an action is, for example, an action in a standard task performed on a production line of a factory, and has the following properties.

Property 1: a difference between each action configuring a task is a difference in a combination of limited plural movements.

Property 2: plural postures observed when the same task is performed are similar to each other.

In the present exemplary embodiment, based on property 1, all actions are configured by movements contained in a single movement set. As illustrated in the example in FIG. 3, a movement set includes, for example, three movements m11, m12, m13.

For example, the movement m11 may be "raise arm", the movement m12 may be "lower arm", and the movement m13 may be "extend arm forward". The number of movements contained in the movement set is not limited to the example illustrated in FIG. 3. The number of movements contained in each action is also not limited to the examples illustrated in FIG. 3.

Figure 3:
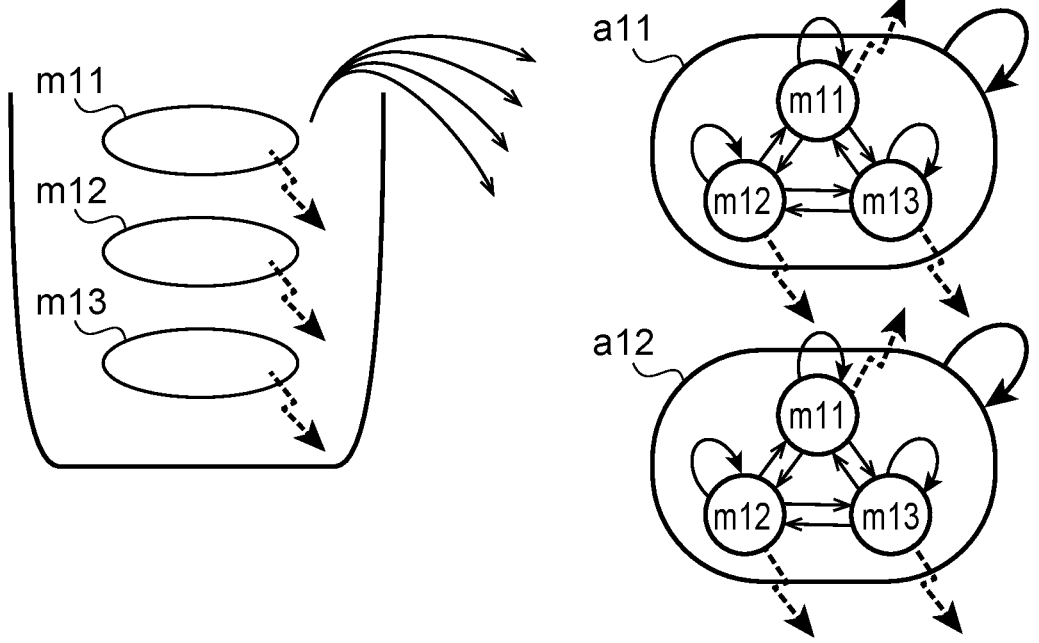
FIG. 3 is a schematic diagram illustrating an example of states of a first hidden Markov model of the present exemplary embodiment.

In the HMM of FIG. 3, action segments can be learned using unsupervised data because observation probabilities of each movement corresponding to the broken line arrows are not dependent on the action. Learning is performed, for example, using machine learning, a neural network, deep learning, or the like.

More specifically, a model employed for unsupervised learning of observation probabilities may be a Gaussian mixture model (GMM). For each observation, a single movement is selected probabilistically from out of the movements, and a Gaussian distribution is generated for this movement. This is a different assumption to supervised learning not using a time series dependency relationship of observation. The parameters of each Gaussian distribution of the trained GMM are assigned to Gaussian distributions that are probability distributions of the observation probabilities for each movement.

As described below, the transition probability learning section 12 learns the transition probabilities of the movements of the first HMMs using learning data appended with taught information (hereafter referred to as supervised data). The taught information is information giving a correct answer of a time segment in which each action occurs for posture time series data. The training is, for example, performed using maximum likelihood estimation and an expectation maximization algorithm (EM algorithm) or the like (another approach may also be employed therefor, such as machine learning, a neural network, deep learning, or the like).

Generating supervised data takes both time and effort. Thus in the present exemplary embodiment the learnt observation probabilities are fixed in the observation probability learning section 11, and transition probabilities are learned from the existing supervised data.

Figure 4:
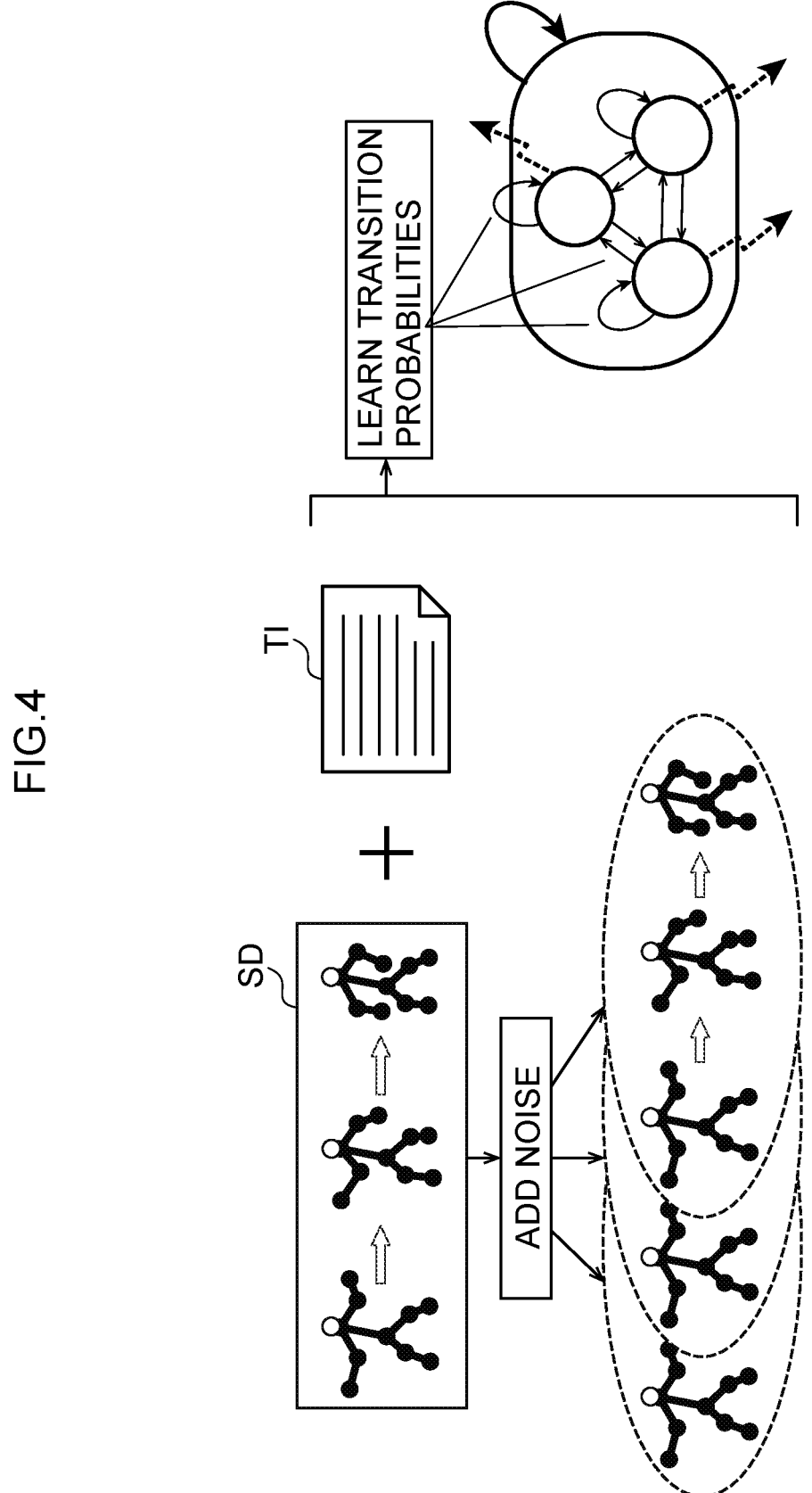
FIG. 4. is a schematic diagram to explain augmentation of supervised data.
Figure 5:
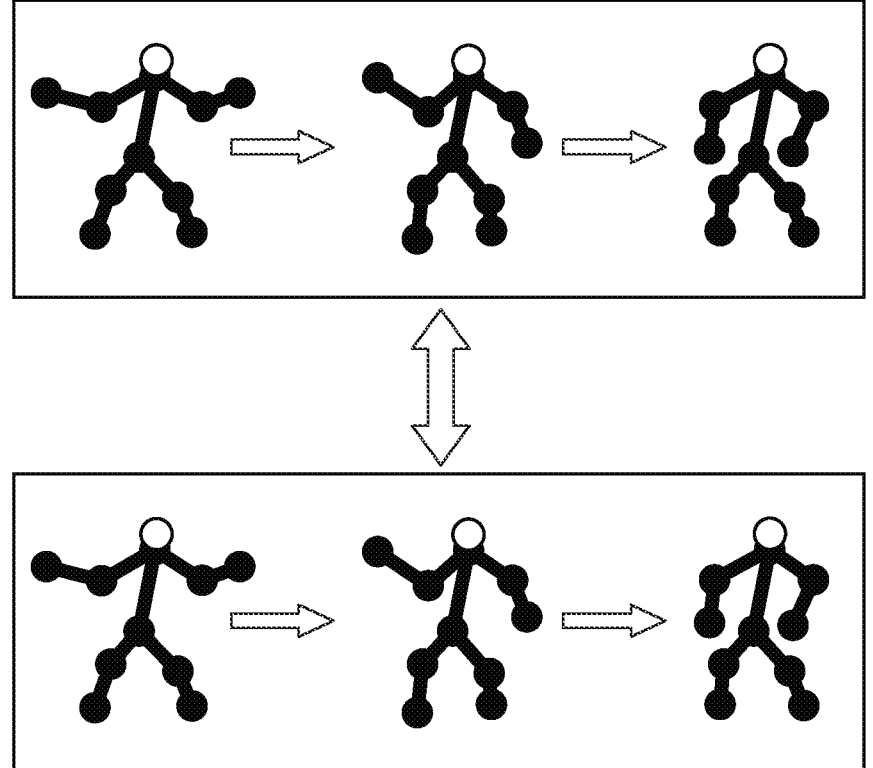
FIG. 5 is a schematic diagram to explain augmentation of supervised data.

More specifically, as illustrated in the example of FIG. 4, data of existing supervised data, which is an example of first supervised data, is used as seed data SD, noise is added to the seed data SD, and the data is augmented by oversampling therefrom. From above property 2 it follows that postures for the same task are similar to each other, and so by adding noise, data can be generated that has a similar variation to the variation of each actual observation such as in the example illustrated in FIG. 5. The noise may, for example, be random noise.

The supervised data is augmented by applying taught information TI of the seed data SD commonly across respective items of the augmented data. The augmented supervised data, which is an example of second supervised data, is employed to learn the transition probabilities of plural movements of the first HMIs using supervised learning.

In oversampling, noise of a prescribed range is generated and added to observation samples at each clock-time. When generating noise, movements having a high probability of having generated the observation sample are identified, and noise added thereto is generated with an appropriate magnitude in consideration of a relationship between spreads in feature space of the sample set of this movement and of a sample set of another movement. This thereby enables more appropriate supervised data to be generated.

For example, noise added may be generated from a multivariate Gaussian distribution having a covariance that is a fixed multiple of the covariance of the sample set of the identified movement. Moreover, a center distance d may be computed from the sample set of the identified movement to the sample set of the movement having a nearest center distance thereto, and the noise added may be generated from an isotropic Gaussian distribution (i.e. with a covariance matrix that is a diagonal matrix) such that a standard deviation in each axis direction of feature space is a fixed multiple of d.

There are differences in the scattering of samples included in the sample set of each movement, namely in the spread in feature space. Namely, scattering in some movements is extremely small, and in some movements is extremely large. Were random noise of a fixed range to be employed for all the movements, then the way in which variation is induced by the random noise would be relatively small when a sample set of a given movement includes samples having a large scattering. However, the way in which variation is induced by the random noise would be relatively large when a sample set of a given movement includes samples having a small scattering.

Figure 6:
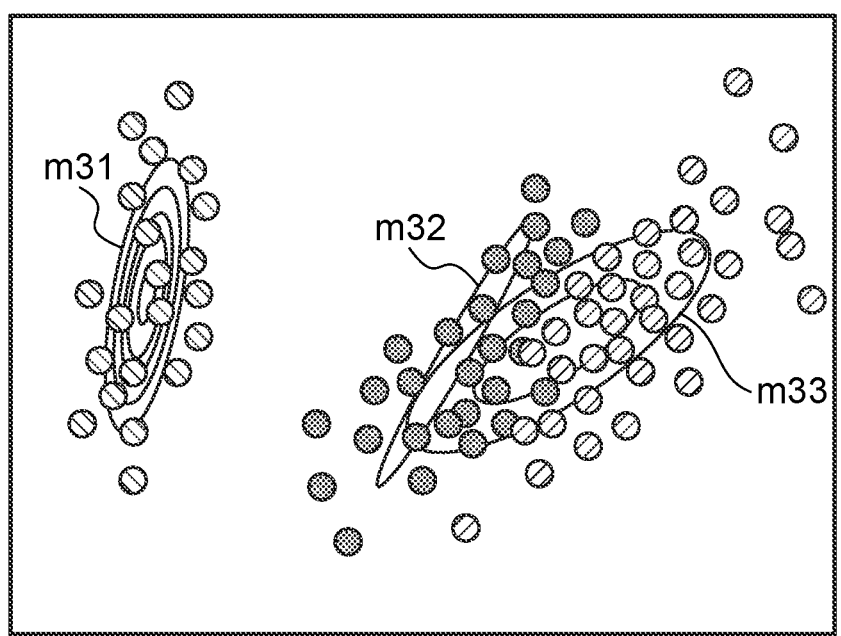
FIG. 6 is a schematic diagram to explain augmentation of supervised data.
Figure 7:
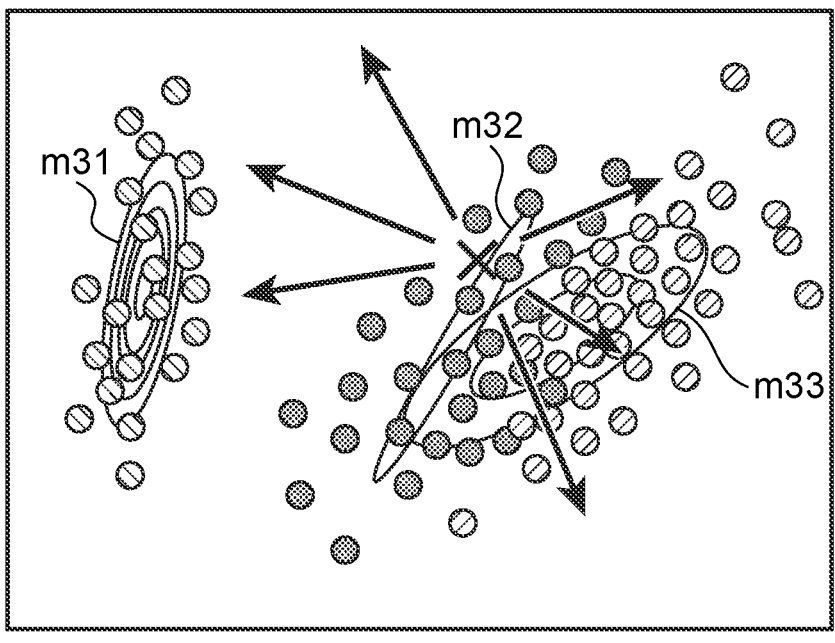
FIG. 7 is a schematic diagram to explain augmentation of supervised data.

FIG. 6 illustrates an example of sample sets of a movement m31, a movement m32, and a movement m33. FIG. 7 illustrates an example of a state in which random noise has been added to the sample set of the movement m32. In FIG. 7, the random noise has a large range, and so there are many samples at a distance from the original movement m32. In such cases too, adding noise of an appropriate magnitude in consideration of a relationship of a manner of spread in feature space between the sample set of a given movement and the sample set of another movement, as described above, enables more appropriate supervised data augmentation.

The building section 13 uses the observation probabilities learnt in the observation probability learning section 11 and the state transition probabilities learnt in the transition probability learning section 12 to build an HSMM such as in the example illustrated in FIG. 1. O1, O2, . . . , O8 represent the observation probabilities learnt in the observation probability learning section 11, and the arrows between the movements m1, m2, and m3 contained in each of the actions a1, a2, a3 correspond to the state transition probabilities learnt in the transition probability learning section 12. d1, d2, d3 represent successive durations of the respective actions, and the probability distributions of the successive durations are determined from the successive durations of the actions of the taught information. For example, the probability distributions of the successive durations may be uniform distributions having a fixed range. Sensor data generated by detecting postures of a person using sensors are applied to the built HSMM, and action segments, which are time segments for each action, are estimated. More specific details regarding estimation are described later.

The action segment estimation model building device 10 of the present exemplary embodiment includes the following characteristics.

1. Observation probabilities of common movements for all actions of the first HMMs are learned by unsupervised learning.

2. Transition probabilities between movements of the first HMMs are learned by supervised learning using the supervised data resulting from augmenting the supervised seed data.

Figure 8:
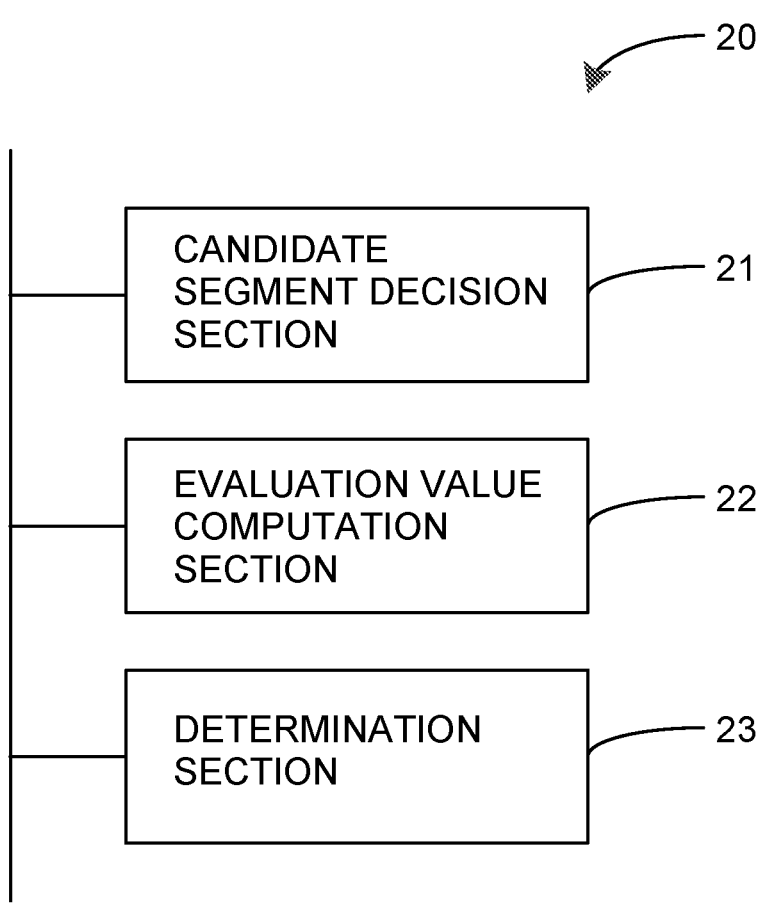
FIG. 8 is a block diagram illustrating an example of a functional configuration of an action sequence determination device of the present exemplary embodiment.

FIG. 8 is an example of a functional block diagram of an action sequence determination device 20 of the present exemplary embodiment. The action sequence determination device 20 includes a candidate segment decision section 21, an evaluation value computation section 22, and a determination section 23. The action sequence determination device 20 determines, from plural observed features of a time series acquired by observing movements of a person, a target action sequence including plural actions expressing plural movements in a prescribed order.

The candidate segment decision section 21 decides plural candidate segments by changing a start clock-time of plural observed features of the time series acquired by observing movements of a person by one clock-time at a time, and for each of the start clock-times, by changing an end clock-time that is a clock-time temporally after the start clock-time by one clock-time at a time. The candidate segments are candidates of a target action sequences corresponding to the target action series. These changes are not limited to being performed one clock-time at a time, and may, for example, be performed two clock-times at a time, or three clock-times at a time.

The evaluation value computation section 22 employs an action segment estimation model to estimate an action segment that is a time segment of an action contained in the candidate segments decided by the candidate segment decision section 21. The action segments may be estimated using the above action segment estimation model, or may be estimated by another existing technology. The evaluation value computation section 22 computes a likelihood of an action in each action segment contained in the candidate segments, and computes a relative goodness of fit by normalizing the likelihoods for the respective action segments. The likelihood expresses a plausibility that a given action is an action according to an order of the action sequence.

For each of the action segments, the evaluation value computation section 22 selects the relative goodness of fit of an action corresponding to the action segment according to the order of actions in the target action sequence, and computes a representative value of the selected relative goodness of fits as an evaluation value. The representative value may be a mean, a median, an infinite product, or the like of the selected relative goodness of fit. The determination section 23 determines being the target action sequence or not by comparing the evaluation value against a common threshold. The common threshold is a fixed value that may be decided experimentally.

The action sequence determination device 20 normalizes the likelihood such that the relative goodness of fit is, for example, in a range of from 0.0 to 1.0. In the present exemplary embodiment, due to the likelihood being normalized, the target action sequence can be determined by using a common threshold, namely a fixed value, rather than a relative value, as the threshold. The common threshold may be determined experimentally and may, for example, be 0.5.

The likelihood can, for example, be computed by Equation (1) below when an action model is a GMM not considering order. Consider a case in which the action segments of action A have observation feature values $x_1$, $x_2$, $x_3$.

Equation (1)

$$P(x_1, x_2, x_3 \mid A) = P(x_1 \mid A)P(x_2 \mid A)P(x_3 \mid A) \tag{1}$$

The likelihood can, for example, be computed by Equation (2) below when the action model is an HMM considering order. $s_t$ represents a state at each clock-time related to internal state transitions of action A.

Equation (2)

$$P(x_1, x_2, x_3 \mid A) = \tag{2}$$

$$\sum_{s_1, s_2, s_3} P(s_1)P(x_1 \mid s_1)P(s_2 \mid s_1)P(x_2 \mid s_2)P(s_3 \mid s_2)P(x_3 \mid s_3)$$

Figure 9:
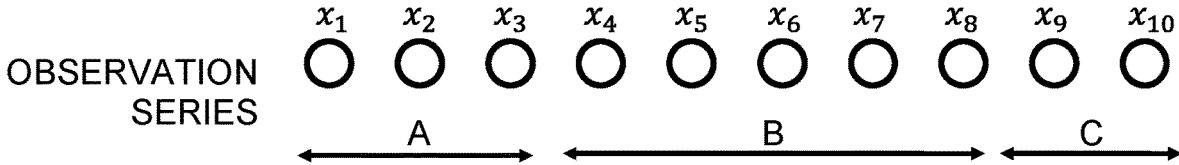
FIG. 9 is a schematic diagram to explain target action sequence determination.

FIG. 9 illustrates examples of candidate segments of the target action sequence containing actions in the order action A, action B, action C. Description follows for a case in which the action segment at a position corresponding to action A is estimated to be $x_1$, $x_2$, $x_3$, the action segment at a position corresponding to action B is estimated to be $x_4$, $x_5$, $x_6$, $x_7$, $x_8$, and the action segment at a position corresponding to action C is estimated to be $x_9$, $x_{10}$.

A likelihood of the action segment at the position corresponding to action A in the target action sequence being action C, the likelihood of being action B, and the likelihood of being action A, are as follows.

$$P(x_1, x_2, x_3 \mid C) = 1.1 \times 10^{-22}$$

$$P(x_1, x_2, x_3 \mid B) = 3.4 \times 10^{-9}$$

$$P(x_1, x_2, x_3 \mid A) = 6.8 \times 10^{-8}$$

When the likelihood of being action C, the likelihood of being action B, and the likelihood of being action A are each normalized, then the relative goodnesses of fit are as follows.

$$1.1 \times 10^{-22} / \left(1.1 \times 10^{-22} + 3.4 \times 10^{-9} + 6.8 \times 10^{-8}\right) = 0.00$$

$$3.4 \times 10^{-9} / \left(1.1 \times 10^{-22} + 3.4 \times 10^{-9} + 6.8 \times 10^{-8}\right) = 0.05$$

$$6.8 \times 10^{-8} / \left(1.1 \times 10^{-22} + 3.4 \times 10^{-9} + 6.8 \times 10^{-8}\right) = 0.95$$

A likelihood of the action segment at the position corresponding to action B in the target action sequence being action C, the likelihood of being action B, and the likelihood of being action A, are as follows.

$$P(x_4, x_5, x_6, x_7, x_8 \mid C) = 9.0 \times 10^{-9}$$

$$P(x_4, x_5, x_6, x_7, x_8 \mid B) = 6.1 \times 10^{-7}$$

$$P(x_4, x_5, x_6, x_7, x_8 \mid A) = 9.1 \times 10^{-9}$$

When the likelihood of being action C, the likelihood of being action B, and the likelihood of being action A are each normalized, then the relative goodnesses of fit are as follows.

$$9.0 \times 10^{-9} / \left(9.0 \times 10^{-9} + 6.1 \times 10^{-7} + 9.1 \times 10^{-9}\right) = 0.01$$

$$6.1 \times 10^{-7} / \left(9.0 \times 10^{-9} + 6.1 \times 10^{-7} + 9.1 \times 10^{-9}\right) = 0.97$$

$$9.1 \times 10^{-9} / \left(9.0 \times 10^{-9} + 6.1 \times 10^{-7} + 9.1 \times 10^{-9}\right) = 0.01$$

A likelihood of the action segment at the position corresponding to action C in the target sequence being action C, the likelihood of being action B, and the likelihood of being action A, are as follows.

$$P(x_9, x_{10} \mid C) = 3.6 \times 10^{-5}$$

$$P(x_9, x_{10} \mid B) = 8.2 \times 10^{-6}$$

$$P(x_9, x_{10} \mid A) = 5.7 \times 10^{-8}$$

When the likelihood of being action C, the likelihood of being action B, and the likelihood of being action A are each normalized, then the relative goodnesses of fit are as follows.

$$3.6 \times 10^{-5} / \left(3.6 \times 10^{-5} + 8.2 \times 10^{-6} + 5.7 \times 10^{-8}\right) = 0.81$$

$$8.2 \times 10^{-6} / \left(3.6 \times 10^{-5} + 8.2 \times 10^{-6} + 5.7 \times 10^{-8}\right) = 0.19$$

$$5.7 \times 10^{-8} / \left(3.6 \times 10^{-5} + 8.2 \times 10^{-6} + 5.7 \times 10^{-8}\right) = 0.00$$

In cases in which the representative value is the mean, the representative value is computed as set out below from the likelihood that the action segment at the position corresponding to action A is action A, from the likelihood that the action segment at the position corresponding to action B is action B, and from the likelihood that the action segment at the position corresponding to action C is action C.

$$(0.95 + 0.97 + 0.81) / 2 = 0.91$$

In cases in which the common threshold is 0.5, then in the example described above, the candidate segment can be determined as being the target action sequence.

Figure 10:
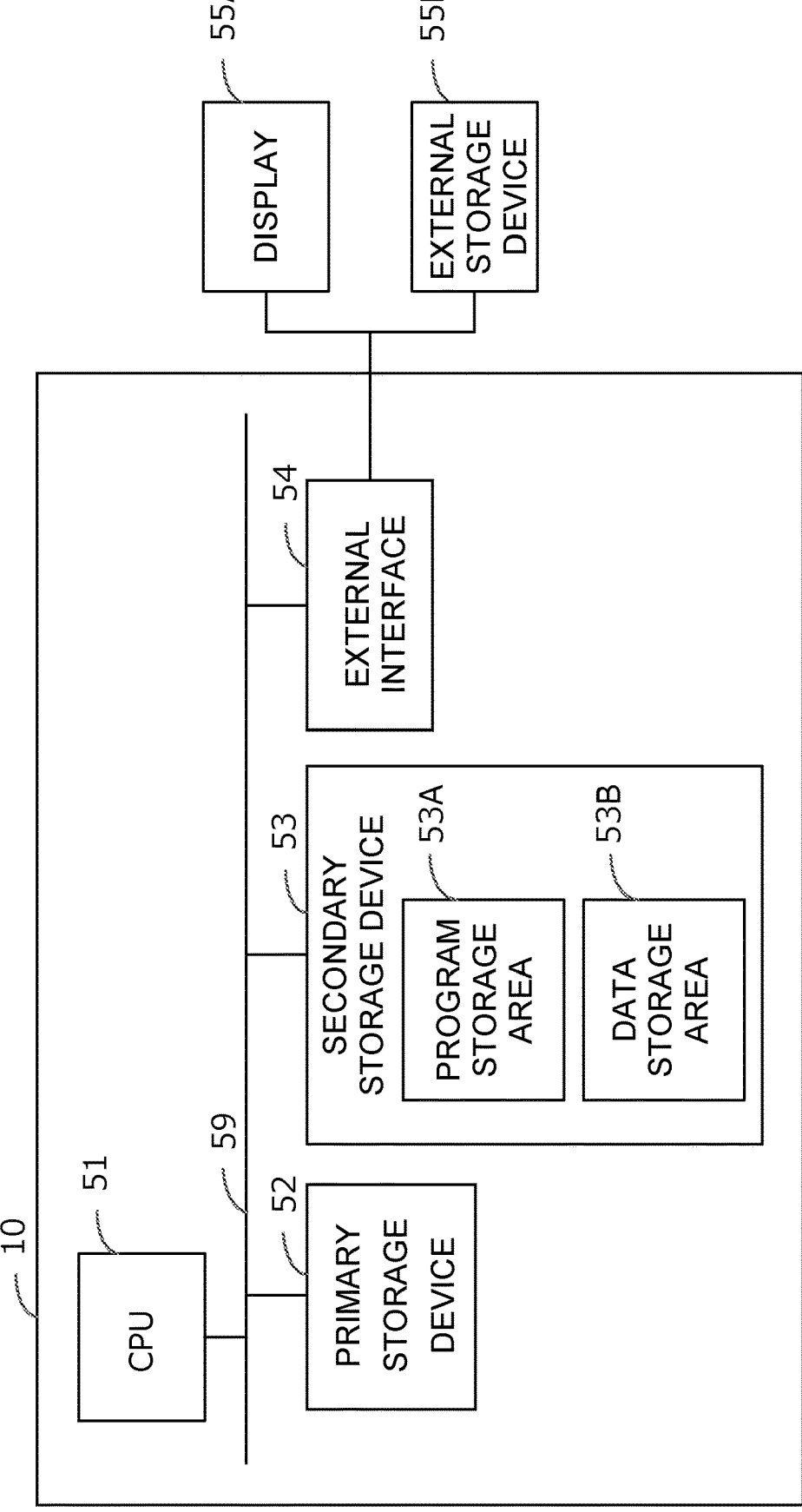
FIG. 10 is a block diagram illustrating an example of a hardware configuration of the present exemplary embodiment.

The action segment estimation model building device 10 includes, as an example, a central processing unit (CPU) 51, a primary storage device 52, a secondary storage device 53, and an external interface 54, as illustrated in FIG. 10. The CPU 51 is an example of a processor, which is hardware. The CPU 51, the primary storage device 52, the secondary storage device 53, and the external interface 54 are connected together through a bus 59. The CPU 51 may be configured by a single processor, or may be configured by plural processors. A graphics processing unit (GPU) may also be employed, for example, instead of the CPU 51.

The primary storage device 52 is, for example, volatile memory such as random access memory (RAM) or the like. The secondary storage device 53 is, for example, non-volatile memory such as a hard disk drive (HDD) or a solid state drive (SSD).

The secondary storage device 53 includes a program storage area 53A and a data storage area 53B. The program storage area 53A is, for example, stored with a program such an action segment estimation model building program or the like. The data storage area 53B is, for example, stored with supervised data, unsupervised data, learnt observation probabilities, transition probabilities, and the like.

The CPU 51 reads the action segment estimation model building program from the program storage area 53A and expands the action segment estimation model building program in the primary storage device 52. The CPU 51 acts as the observation probability learning section 11, the transition probability learning section 12, and the building section 13 illustrated in FIG. 2 by loading and executing the action segment estimation model building program.

Note that the program such as the action segment estimation model building program may be stored on an external server, and expanded in the primary storage device 52 over a network. Moreover, the program such as the action segment estimation model building program may be stored on a non-transitory recording medium such as a digital versatile disc (DVD), and expanded in the primary storage device 52 through a recording medium reading device.

An external device is connected to the external interface 54, and the external interface 54 performs a role in exchanging various information between the external device and the CPU 51. FIG. 10 illustrates an example in which a display 55A and an external storage device 55B are connected to the external interface 54. The external storage device 55B is, for example, stored with supervised data, unsupervised data, the built HSMM, and the like. The display 55A displays, for example, so as to enable viewing of the built HSMM model.

The action segment estimation model building device 10 may, for example, be a personal computer, a server, a computer in the cloud, or the like.

The action segment estimation model building device 10 of FIG. 10 functions as the action sequence determination device 20 by the built HSMM being stored in the data storage area 53B.

The CPU 51 reads the action sequence determination processing from the program storage area 53A and expands the action sequence determination program in the primary storage device 52. The CPU 51 acts as the candidate segment decision section 21, the evaluation value computation section 22, and the determination section 23 illustrated in FIG. 8 by loading and executing the action sequence determination program.

Note that the program such as the action sequence determination program and the like may be stored on an external server, and expanded in the primary storage device 52 over a network. Moreover, the program such as the action sequence determination program may be stored on a non-transitory recording medium such as a digital versatile disc (DVD), and expanded in the primary storage device 52 through a recording medium reading device.

The external storage device 55B is, for example, stored with the action sequence determined as being the target action sequence to be utilized in later processing. The display 55A displays so as to make, for example, the action sequence determined as being the target action sequence visible.

Figure 11:
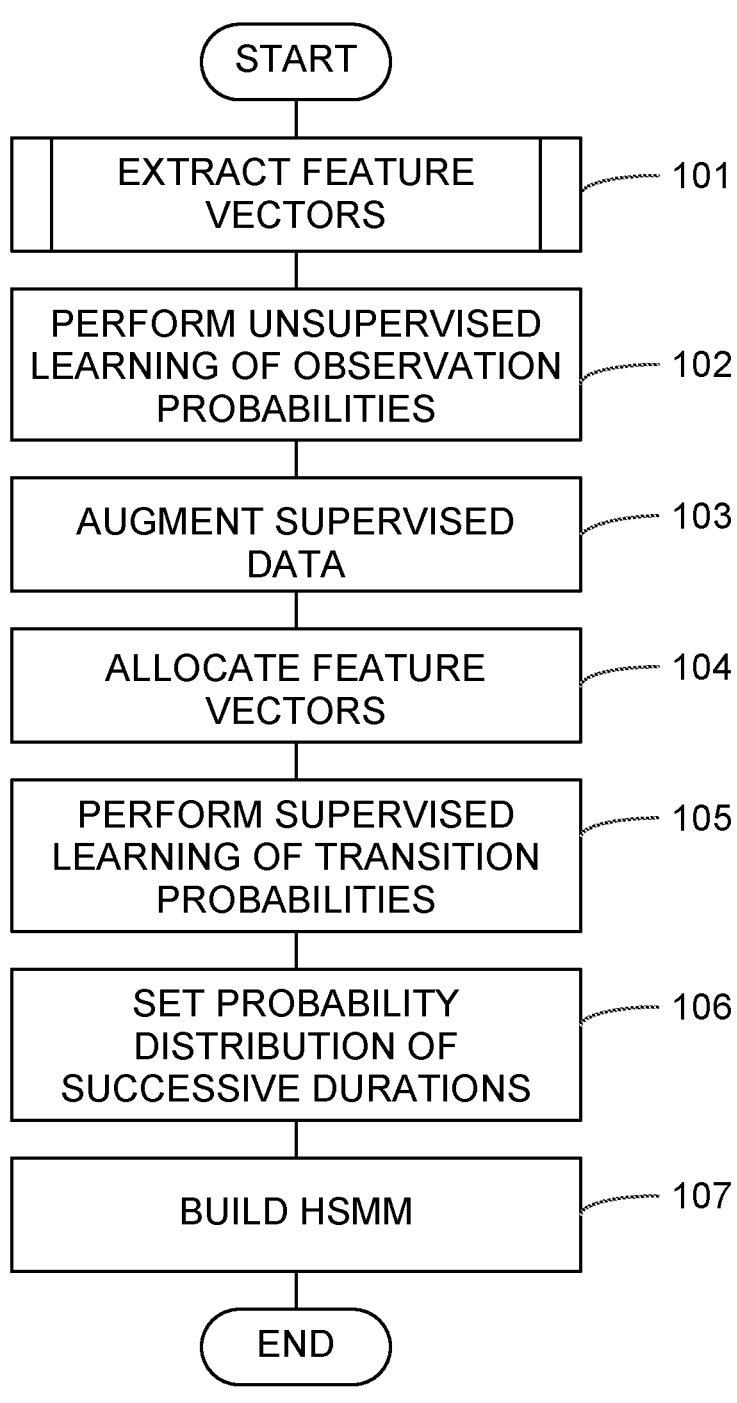
FIG. 11 is a flowchart illustrating an example of a flow of action segment estimation model building processing.

FIG. 11 illustrates an example of a flow of action segment estimation model building processing. At step 101, the CPU 51 extracts feature vectors expressing a motion that is a series of postures of a person from learning data, as described below. At step 102, the CPU 51 performs clustering (GMM parameter estimation) on the feature vectors extracted at step 101 so as to classify into elemental movements, and learns the observation probabilities of each movement using unsupervised learning.

At step 103, the CPU 51 adds noise to the supervised seed data, and augments the supervised data by appending the taught information of the supervised seed data to the data generated by oversampling. At step 104, the CPU 51 allocates the feature vectors for the supervised data to respective time segments of the actions appended with the taught information.

At step 105, the CPU 51 takes a time series of the feature vectors in the time segments allocated at step 104 as observation data, and uses the supervised data augmented at step 103 to learn the transition probabilities of the movements of the first HMMs using supervised learning.

At step 106, the CPU 51 sets, as a probability distribution of successive durations of respective actions, a uniform distribution having a prescribed range for the successive durations of the respective actions appended with the taught information. The CPU 51 uses the observation probabilities learnt at step 102 and the transition probabilities learnt at step 105 to build an HSMM. The HSMM is built to transition actions of the second HMIs in an order of the actions appended with the taught information after a fixed period of time set at step 106 has elapsed. The built HSMM may, for example, be stored in the data storage area 53B.

Figure 12:
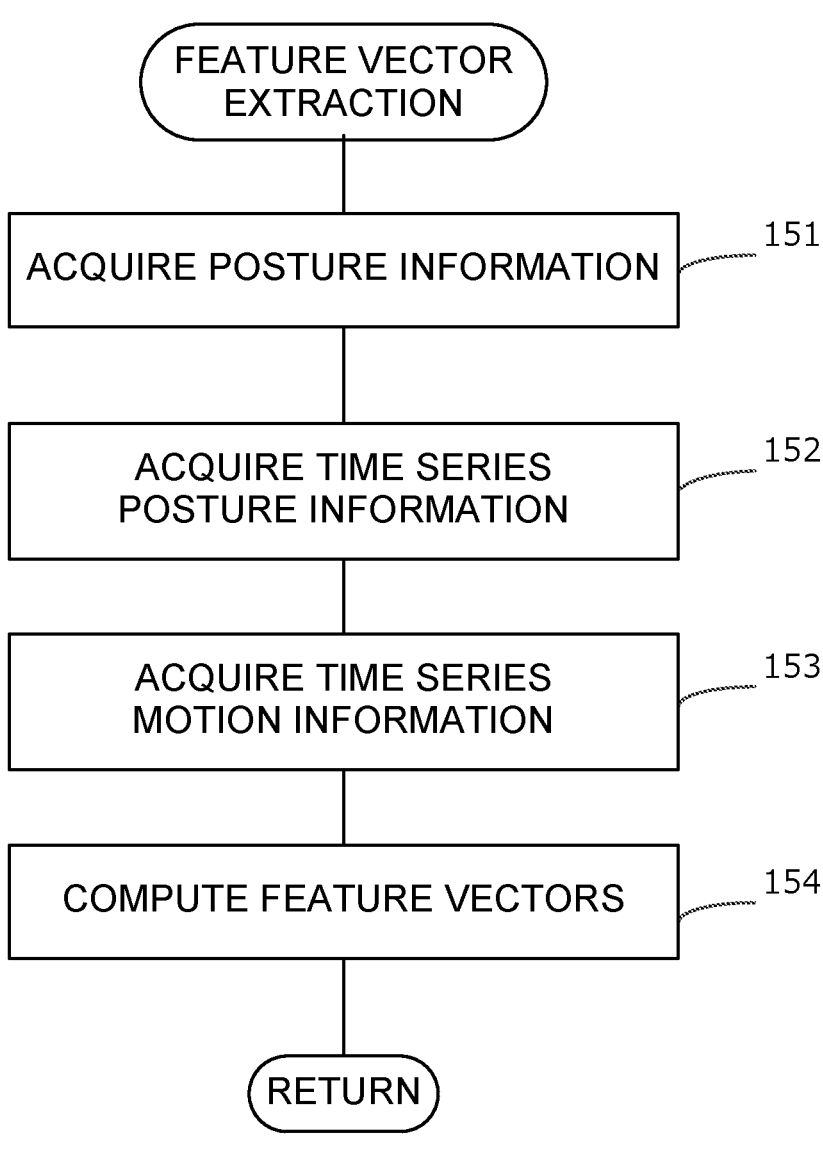
FIG. 12 is a flowchart illustrating an example of a flow of feature vector extraction processing.

FIG. 12 illustrates an example of detail of the feature vector extraction processing of step 101 of FIG. 11. At step 151, the CPU 51 acquires posture information of a person by detecting and tracking a person in data employed for training. In cases in which the posture information acquired at step 151 contains posture information for plural people, at step 152 the CPU 51 acquires, from the time series data of posture information, time series data of posture information that is the target for analysis. The analysis target posture information is selected from a size of a bounding box around the person, time, or the like.

At step 153, the CPU 51 acquires time series data of motion information for each location on a body from the time series data of the posture information acquired at step 152. The time series data of the motion information may, for example, be curvature, curvature speed, and the like for each location. The locations may, for example, be an elbow, a knee, or the like.

At step 154, the CPU 51 uses a sliding time window to compute feature vectors by averaging the motion information of step 153 in the time direction within a window for each fixed time interval.

Figure 13:
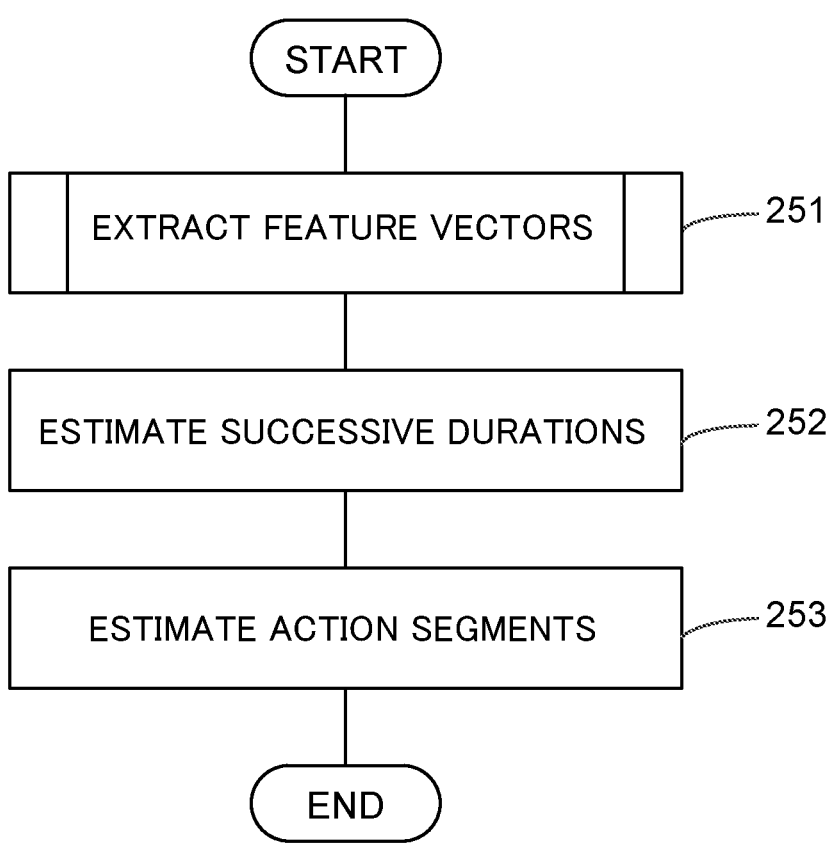
FIG. 13 is a flowchart illustrating an example of a flow of action segment estimation processing.

FIG. 13 illustrates an example of a flow of action segment estimation processing employing the HSMM built in the present exemplary embodiment. The action segment estimation model building device 10 of FIG. 10 may function as the action segment estimation device by storing the built HSMM in the data storage area 53B.

At step 251, the CPU 51 extracts feature vectors from sensor data generated by detecting postures of a person using sensors. The sensors are devices to detect person posture and may, for example, be a camera, infrared sensor, motion capture device, or the like. Step 251 of FIG. 11 is similar to step 101 of FIG. 13, and so detailed explanation thereof will be omitted.

At step 252, the CPU 51 takes a time series of the feature vectors extracted at step 251 as observation data, and estimates successive durations of the action states by comparison against the HSMM built using the action segment estimation model building processing. At step 253, the CPU 51 estimates time segments of each action from the successive durations of each action state estimated at step 252.

For example, in technology employing a video as input so as to recognize a particular action in the video, basic movement recognition, element action recognition, and higher level action recognition are performed. A particular action in a video is a more complicated higher level action from combining element actions, basic movement recognition is posture recognition for each frame, and element action recognition is performed by temporal spatial recognition, and recognizes a simple action over a given length of time. Higher level action recognition is recognition of a complex action over a given length of time. In such technology, the action segment estimation model building processing and the built action segment estimation model of the present exemplary embodiment are applied so as to enable estimation of action segments.

Figure 14:
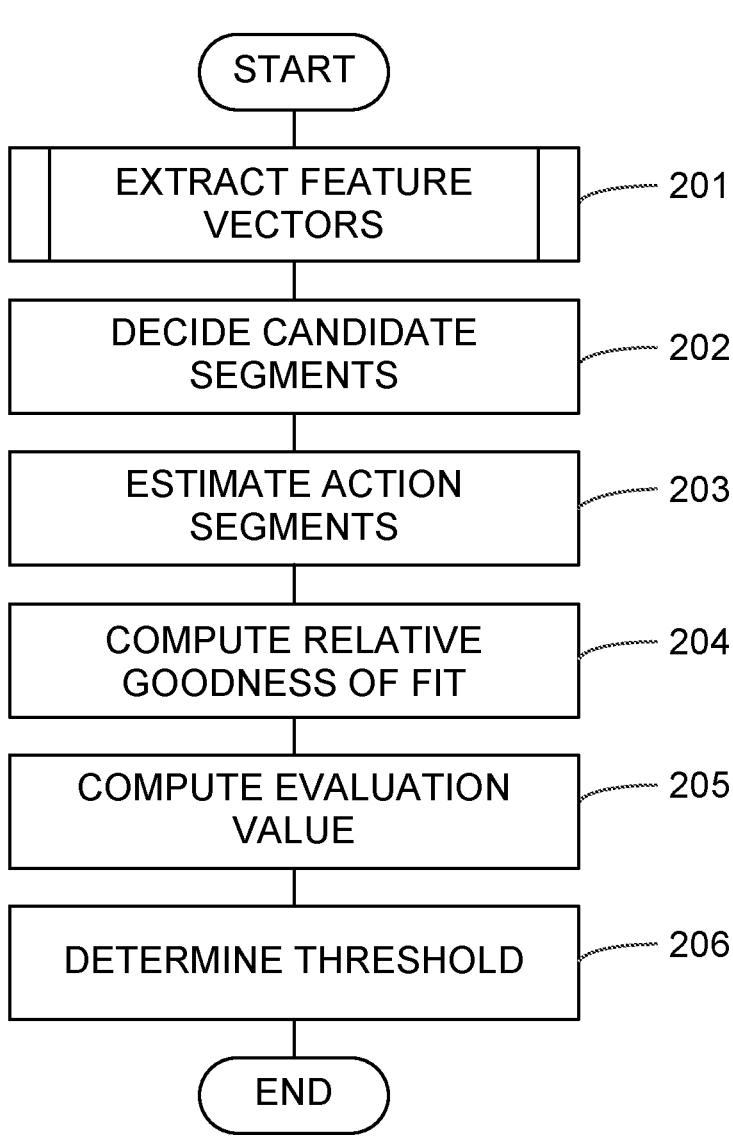
FIG. 14 is a flowchart illustrating an example of a flow of action sequence determination processing.

FIG. 14 illustrates an example of a flow of action sequence determination processing employing the built HSMM of the present exemplary embodiment.

At step 201, the CPU 51 extracts feature vectors from sensor data generated by detecting postures of a person using sensors. The sensors are devices to detect person posture and may, for example, be a camera, infrared sensor, motion capture device, or the like. Step 201 of FIG. 14 is similar to step 101 of FIG. 11, and so detailed explanation thereof will be omitted.

At step 202, the CPU 51 decides candidate segments for the target action sequence by trying all combinations of start clock-times and end clock-times. At step 203, the CPU 51 takes the time series of feature vectors extracted at step 201 as observation data, and estimates successive durations of the action states by comparison against the HSMM built using the action segment estimation model building processing. The time segments of each action are estimated from the estimated successive durations of each action state.

At step 204, the CPU 51 computes a relative goodness of fit by normalizing the likelihoods, namely the observation probabilities, of the model of actions for each action segment of the candidate segments. At step 205, the CPU 51 employs the relative goodnesses of fit of the actions corresponding to the action segments according to the order of actions in the target action sequence to compute a representative value, and takes the representative value as an evaluation value. At step 206, the CPU 51 determines being the target action sequence or not by comparing the evaluation value against the common threshold.

At step 202, plural candidate segments are decided by changing the start clock-time from a first clock-time to a second clock-time, and then for each start clock-time, changing the end clock-time from a third clock-time to a fourth clock-time that are clock-times temporally after the start clock-time. The processing of steps 203 to step 206 are applied to each of the plural candidate segments decided at step 202.

In cases in which the plural candidate segments determined as being the target action sequence partially overlap with each other, the candidate segment having the highest evaluation value may be determined as being the target action sequence. The action sequence determined as being the target action sequence may be extracted as a processing target action sequence and recorded in the data storage area 53B, and the start clock-time and the end clock-time of the action sequence determined as being the target action sequence may be recorded in the data storage area 53B.

Figure 15:
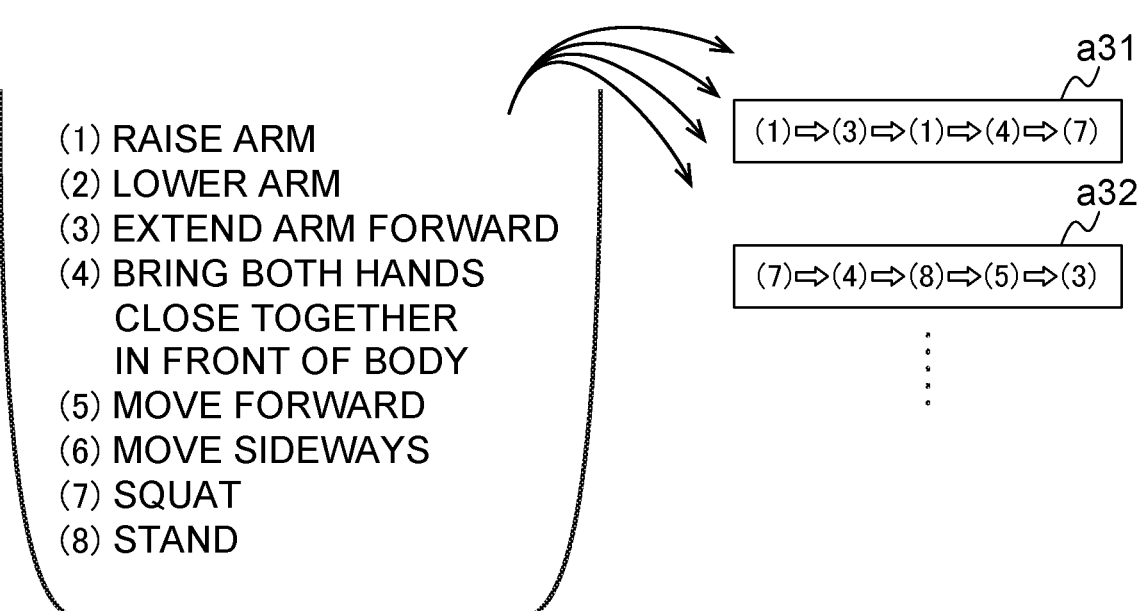
FIG. 15 is a schematic diagram to explain actions of related technology.

An HSMM in which movements included in actions are not particularly limited may be employed in related technology. In such related technology, for example as illustrated in the example in FIG. 15, suppose that the following movements are present.

(1) raise arm, (2) lower arm, (3) extend arm forward, (4) bring both hands close together in front of body, (5) move forward, (6) move sideways, (7) squat, (8) stand.

Examples of actions are as set out below:

Action a31: (1) raise arm→(3) extend arm forward→(1) raise arm→(4) bring both hands close together in front of body→(7) squat;

Action a32: (7) squat→(4) bring both hands close together in front of body→(8) stand→(5) move forward→(3) extend arm forward; and the like.

Figure 16:
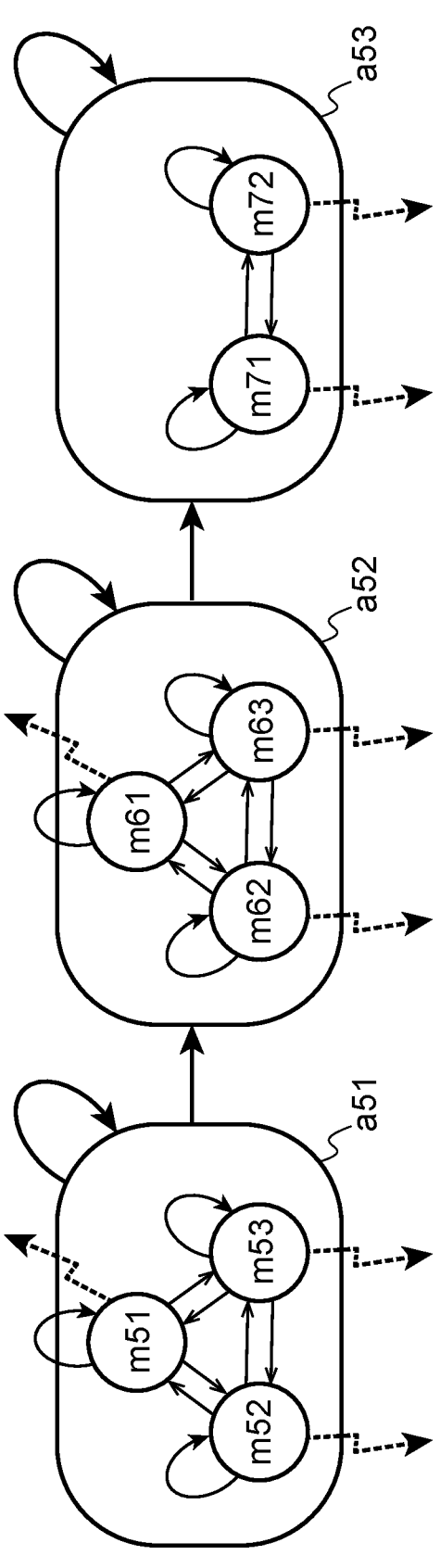
FIG. 16 is a schematic diagram illustrating an example of a hierarchical hidden Markov model of related technology.

As described above, in cases in which an HMM includes movements of general actions, namely plural movements that are not limited for the action to be estimated, the observation probabilities of the movements are difficult to express as a single simple probability distribution. In order to address this issue there is technology that employs a hierarchical hidden Markov model. As illustrated in the example in FIG. 16, a hierarchical hidden Markov model includes a higher level HMM containing plural lower level HMMs as states. Actions a51, a52, and a53 are examples of lower level HMMs. Each of the lower level HMMs includes movements as states, and examples of movements are m51, m52, m53, m61, m62, m62, m63, m71, and m72.

Figure 17:
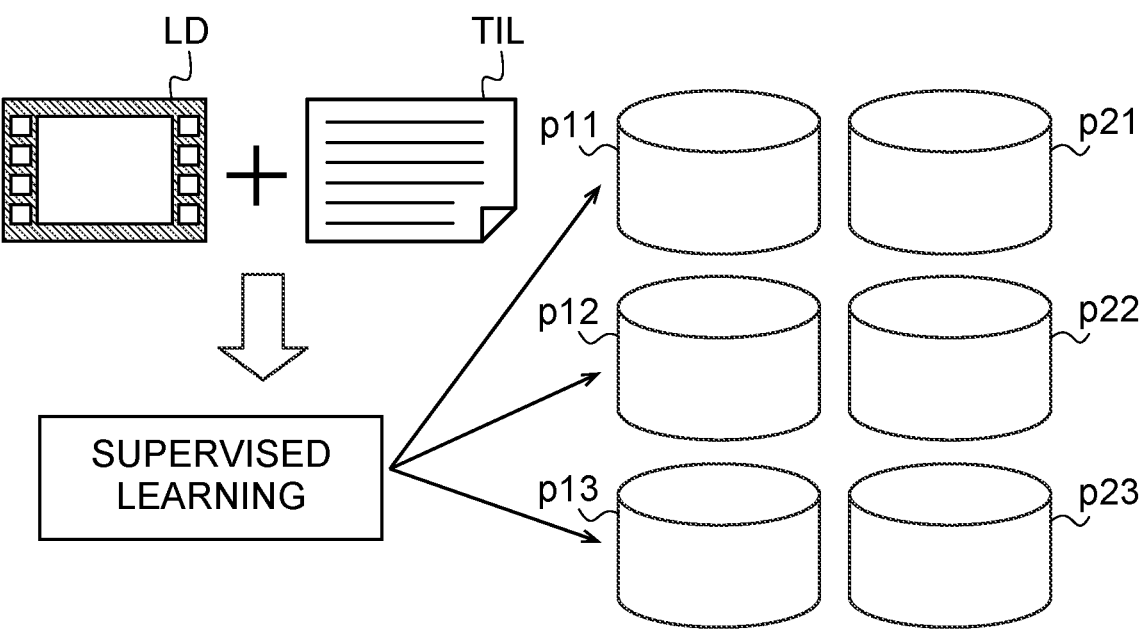
FIG. 17 is a schematic diagram illustrating an example of an overview of related technology.

As illustrated in the example in FIG. 17, a hierarchical HMM uses learning data LD appended with taught information TIL, and learns observation probabilities and transition probabilities of movements for each action by supervised learning. FIG. 17 illustrates an example of the observation probability p11 and the transition probability p21 of an action a51, the observation probability p12 and the transition probability p22 of an action a52, and the observation probability p13 and the transition probability p23 of an action a53. However, in a hierarchical HMM there is a great number of parameters and the degrees of freedom for the parameters are high, and so a great volume of supervised data is employed to learn the parameters. This means that time and effort is needed to create taught information for the supervised data.

Figure 18:
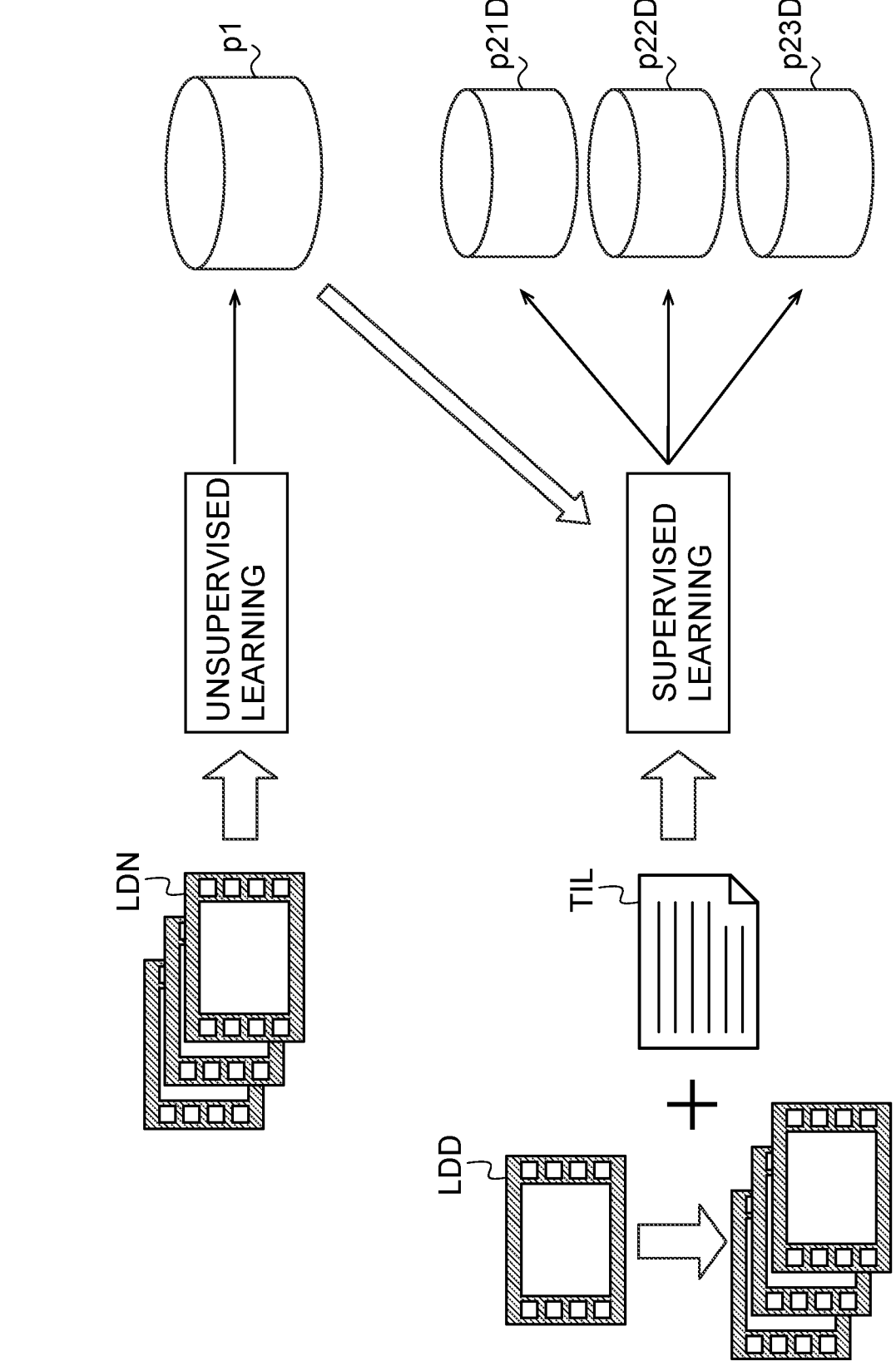
FIG. 18 is a schematic diagram illustrating an example of an overview of the present exemplary embodiment.

However, in the present disclosure, as illustrated in the example of FIG. 18, the common observation probabilities p1 of the respective first HMMs corresponding to actions of the HSMM are learned by unsupervised learning using the unsupervised data LDN. The learned observation probabilities p1 are fixed, and the transition probabilities p21D, p22D, p23D of the respective movements of the first HMMs are learned by supervised learning employing the supervised data. In the present disclosure, the supervised data is augmented, by adding the taught information TIL of the supervised data LDD to data generated by adding noise to the existing supervised data LDD and oversampling, and this augmented supervised data is employed in supervised learning. Thus in the present exemplary embodiment an action segment estimation model can be built efficiently even in cases in which there is only a small volume of existing supervised data.

Figure 19:
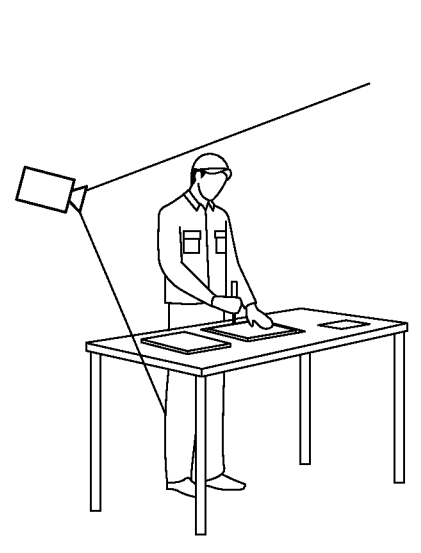
FIG. 19 is a schematic diagram illustrating an example of dividing segments manually in related technology.
Figure 19:
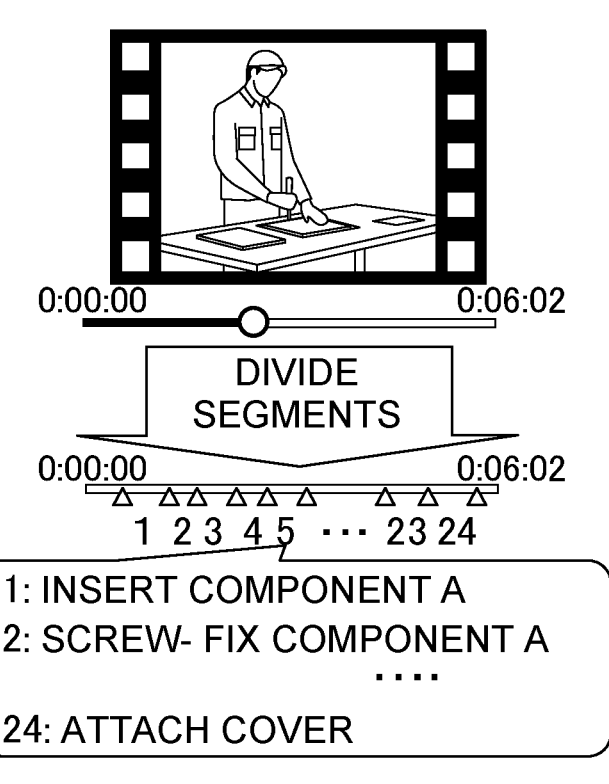

For example, in related technology movements during a task are divided into segments manually. More specifically, as illustrated in the example on the left of FIG. 19, a situation of a series of tasks is captured by a camera, and segments are divided manually by looking at the acquired images, as illustrated in the example on the right of FIG. 19. Time and effort is needed to divide into segments manually for each of the acquired images in such related technology.

Figure 20:
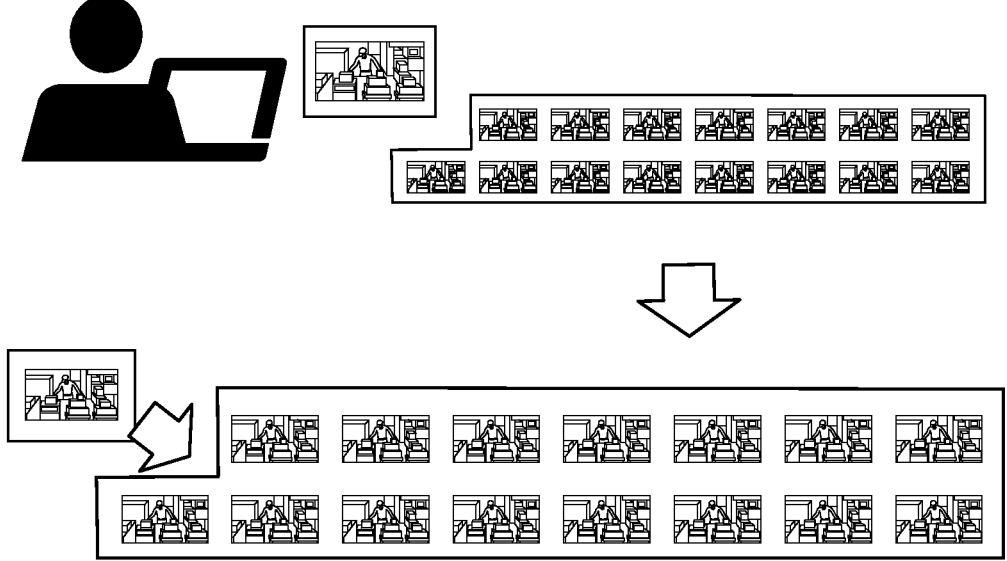
FIG. 20 is a schematic diagram illustrating an example of dividing action segments.

In another related technology, as illustrated in the example at the top of FIG. 20, the action segments during a task may be divided manually based on base data, similarly to the related technology. However, by taking these action segments divided manually as taught information, as in the example illustrated at the bottom of FIG. 20, for other data the time and effort can be avoided by dividing into action segments automatically.

Figure 21:
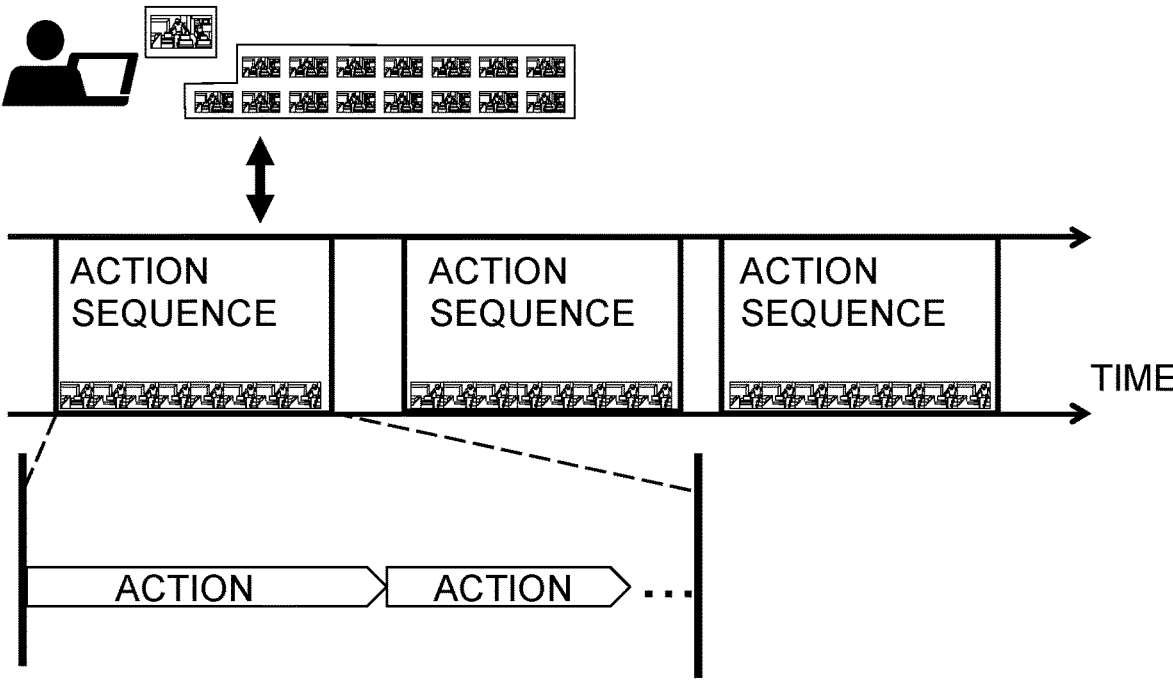
FIG. 21 is a schematic diagram to explain target action sequence determination.

There are actually cases in which plural action sequences that are series of actions of processing targets corresponding to the taught information illustrated as an example at the top of FIG. 21 are contained in a video, and there are furthermore cases in which actions that are not the target action sequence are also contained therein. In the present disclosure, for example, the target action sequence is determined from the video, as illustrated in the example at the bottom of FIG. 21.

Candidate segments are decided due to uncertainty as to which motions are contained in the target action sequence, namely, due to motions other than those of the target action sequence not being modeled, and evaluation is performed as to whether or not a target action is contained in these candidate segments. Namely, determination is of the target action sequence when a computed evaluation value exceeds a threshold.

In cases in which observation information is obtained by a probability model of actions then a likelihood can be computed from the observation probabilities obtained by observation, and these likelihoods might conceivably be utilized as evaluation values. A distribution of observation probabilities with respect to a correct answer action segment is known in cases in which there is a large volume of supervised data, and so deciding a threshold is comparatively easy, however deciding a threshold is difficult in cases in which there is only a small volume of supervised data, namely only a small volume of base data.

In cases in which there is only a small volume of supervised data, for example, a case in which there is only a single sequence worth thereof, then when the observation probability thereof is employed as an evaluation value, which level of value of the observation probability is given a high evaluation varies greatly according to the parameters of the probability model. Thus deciding a fixed threshold, namely a common threshold capable of being commonly employed, is difficult when attempting to detect various action sequences. The parameters of the probability model of actions of the target action sequence need to be adjusted when attempting to utilize a common threshold, and this is not practical.

For example, in a case in which a target action sequence M contains three actions A, B, C in this order, then an nth root of a number of observations of a probability that an observation in each action segment is output from the target action sequence M can be employed as the evaluation value. The evaluation value expresses a mean likelihood of the observation in the action segment as expressed by a geometric mean.

Figure 22:
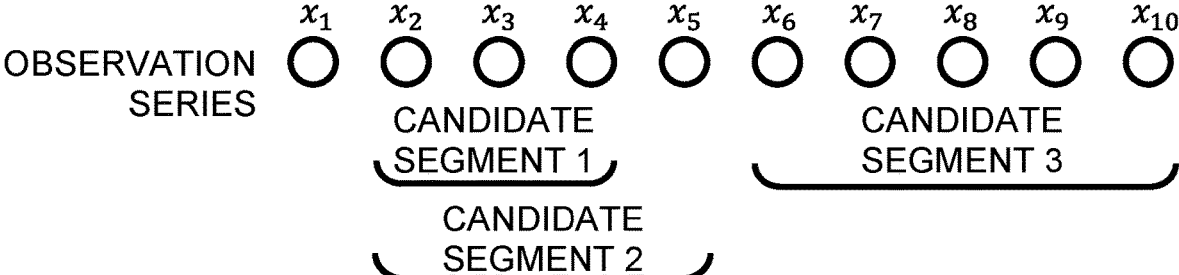
FIG. 22 is a schematic diagram to explain target action sequence determination.

In the example of FIG. 22, a candidate segment 1, a candidate segment 2, and a candidate segment 3 are decided as candidate segments corresponding to the action sequence M. These candidate segments are merely examples thereof, and in reality candidate segments are decided by combining all start clock-times and end clock-times. $x_i$ expresses a movement feature vector at each clock-time (wherein i is a natural number).

In cases in which the evaluation values of candidate segment 1, candidate segment 2, and candidate segment 3 are as set out below, the candidate segment 2 having the greatest evaluation value can be determined to be most like the target action sequence M. However, how many target action sequences M are contained in an observation series is unclear, and sometimes there may be none contained therein.

Equation (3)

Candidate segment 1 evaluation value:

$$\sqrt[3]{P(x_2, x_3, x_4|M)} = 2.8 \times 10^{-8}$$

Candidate segment 2 evaluation value:

-continued
$$\sqrt[4]{P(x_2, x_3, x_4, x_5|M)} = 5.3 \times 10^{-6}$$

Candidate segment 3 evaluation value:

$$\sqrt[5]{P(x_6, x_7, x_8, x_9, x_{10}|M)} = 3.7 \times 10^{-20}$$

Thus although having the greatest evaluation value, the candidate segment 2 is not able to be determined as being the target action sequence. For example, although a comparison may be made with the evaluation value of base data, deciding at what level to set a range of difference to the evaluation value of the base data is difficult in such cases.

For example, for an action segment X at the position of action A of a candidate segment of the target action sequence containing actions A, B, C in this order, consider the observation probabilities P (X|A), P(X|B), P(X|C) from each model of actions A, B, C of the target action sequence. As illustrated in the example at the left of FIG. 23, in cases in which Y is an action segment at a position of action A of a candidate segment of a first worker, then the observation probability P(Y|A) is the greatest from out of the observation probability P(Y|A) of being from action A, observation probability P(Y|B) of being from action B, and observation probability P(Y|C) of being from action C.

Figure 23:
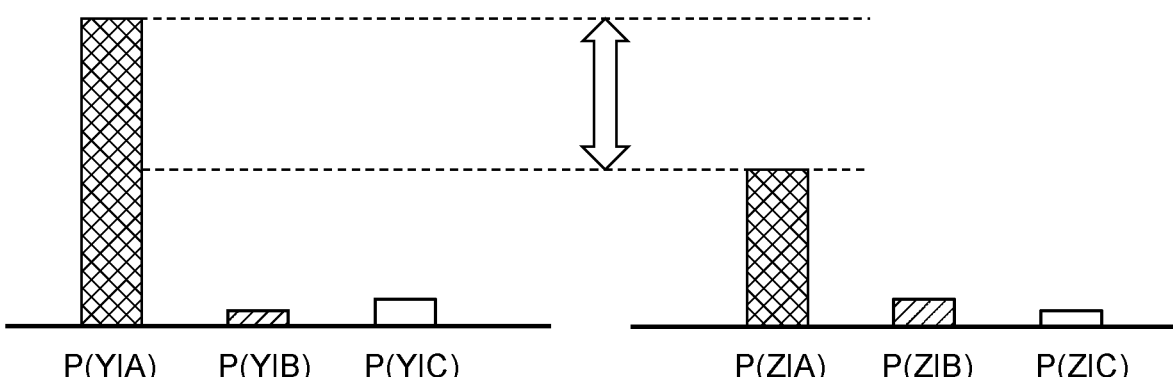
FIG. 23 is a schematic diagram to explain target action sequence determination.

As illustrated in the example at the right of FIG. 23, in cases in which Z is an action segment at a position of action A of a candidate segment of a second worker, then the observation probability P(Z|A) of being from action A is the greatest from out of the observation probability P(Z|A) of being from action A, observation probability P(Z|B) of being from action B, and observation probability P(Z|C) of being from action C. Thus in this manner, even in cases in which there are different workers for example, a relationship is held of the observation probability of action A for the action segment at the position of action A of the candidate segment of the target action sequence being larger than the observation probabilities of actions B, C.

Accordingly, in candidate segments, in cases in which an action segment for which the observation probability of action A is the greatest, an action segment for which the observation probability of action B is the greatest, and an action segment for which the observation probability of action C is the greatest, are present in this order, then these candidate segments can be determined as segments likely corresponding to the target action sequence. This determination is by evaluating an order of actions utilizing the relative relationship of action A, B, C, and sometimes a high evaluation is obtained for a candidate segment not in the target action sequence. However, increasing the number of actions contained in the target action sequence lowers the possibility of such a relative relationship appearing by chance.

However, the observation probability P(Z|A) of the second worker is clearly smaller than the observation probability P(Y|A) of the first worker. Thus when an observation probability is employed as an evaluation value if, for example, there are different workers, then there are cases in which employing a common threshold is difficult because the value is different in magnitude, although the observation probability is still greatest for being from action A.

In the present exemplary embodiment plural candidate segments are decided of a target action series containing plural respective actions expressing plural movements from plural observation features of a time series acquired by observing movements of a person. The respective plural candidate segments are divided by each action segment that is a time segment of an action, and likelihoods corresponding to each of the plural actions computed for each action segment are normalized for each action segment. A representative value of the normalized likelihoods corresponding to respective action segments selected based on an order of actions of the target action series from all the action segments in the candidate segment is computed as an evaluation value. Determination of being the target action series is made in cases in which the evaluation value exceeds a common threshold.

The present disclosure enables easy determination of the target action series from various actions contained in data acquired by observing movements of a person. Namely, for example, even in cases in which a task is performed by various workers in various environments, the target action series can still be determined from the observation series containing various actions by employing a common threshold.

The present disclosure is, for example, able to determine target action series easily from observation series containing plural actions of movements performed in a decided order, such as in a standard tasks in a factory, in dance choreography, and in martial art forms. The determined target action series can also be employed to perform analysis or the like on standard tasks in a factory, on dance choreography, and on martial art forms.

Technical Problem

There is a high cost to observing movements of a person and determining a target action series from various actions contained in data acquired thereby.

One of objects of one aspect the present disclosure is to facilitate observing movements of a person and determining a target action series from various actions contained in data acquired thereby.

One of aspects of the present disclosure enables easy determination of the target action series from various actions contained in data acquired by observing person movements.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An action sequence determination device comprising:
a memory; and
a processor connected to the memory, the processor being configured to:
decide a plurality of candidate segments of a target action series, from a plurality of observation features of a time series that is acquired by observing movements of a person, wherein the respective target action series contains a plurality of actions, and wherein each of the plurality of actions contains a plurality of movements;
divide each of the plurality of candidate segments into each action segment that is a time segment of the action, normalize a likelihood corresponding to each of the plurality of actions computed for each of the action segments by action segment, and compute, as an evaluation value, a representative value of normalized likelihood corresponding to each of the action segments selected from all of the respective action segments in the candidate segments based on an order of actions in the target action series; and
determine that a candidate segment is the target action series in response to the evaluation value exceeding a common threshold,
wherein the likelihood is computed by using observation probabilities of the observation features contained in each of the respective action segments.

2. The action sequence determination device of claim 1, wherein the representative value is any one of a mean value, a median value, or a product total value.

3. The action sequence determination device of claim 1, wherein the plurality of candidate segments are respectively decided by changing a start clock-time from a first clock-time to a second clock-time, and then, for each of the start clock-times, by changing an end clock-time from a third clock-time to a fourth clock-time that are clock-times temporally after the start clock-time.

4. The action sequence determination device of claim 1, wherein a candidate segment determined as the target action series is extracted as a processing target action series.

5. An action series determination method comprising:
by a computer:
deciding a plurality of candidate segments of a target action series, from a plurality of observation features of a time series that is acquired by observing movements of a person, wherein the respective target action series contains a plurality of actions, and wherein each of the plurality of actions contains a plurality of movements;
dividing each of the plurality of candidate segments into each action segment that is a time segment of the action, normalizing a likelihood corresponding to each of the plurality of actions computed for each of the action segments by action segment, and computing, as an evaluation value, a representative value of normalized likelihood corresponding to each of the action segments selected from all of the respective action segments in the candidate segments based on an order of actions in the target action series; and
determining that a candidate segment is the target action series in response to the evaluation value exceeding a common threshold,
wherein the likelihood is computed by using observation probabilities of the observation features contained in each of the respective action segments.

6. The action series determination method of claim 5, wherein the representative value is any one of a mean value, a median value, or a product total value.

7. The action series determination method of claim 5, wherein the plurality of candidate segments are respectively decided by changing a start clock-time from a first clock-time to a second clock-time, and then, for each of the start clock-times, by changing an end clock-time from a third clock-time to a fourth clock-time that are clock-times temporally after the start clock-time.

8. The action series determination method of claim 5, wherein a candidate segment determined as the target action series is extracted as a processing target action series.

9. A non-transitory recording medium storing a program that causes a computer to execute an action sequence determination processing, the processing comprising:
deciding a plurality of candidate segments of a target action series, from a plurality of observation features of a time series that is acquired by observing movements of a person, wherein the respective target action series contains a plurality of actions, and wherein each of the plurality of actions contains a plurality of movements;

dividing each of the plurality of candidate segments into each action segment that is a time segment of the action, normalizing a likelihood corresponding to each of the plurality of actions computed for each of the action segments by action segment, and computing, as an evaluation value, a representative value of normalized likelihood corresponding to each of the action segments selected from all of the respective action segments in the candidate segments based on an order of actions in the target action series; and determining that a candidate segment is the target action series in response to the evaluation value exceeding a common threshold, wherein the likelihood is computed by using observation probabilities of the observation features contained in each of the respective action segments.

10. The non-transitory recording medium of claim 9, wherein the representative value is any one of a mean value, a median value, or a product total value.

11. The non-transitory recording medium of claim 9, wherein the plurality of candidate segments are respectively decided by changing a start clock-time from a first clock-time to a second clock-time, and then, for each of the start clock-times, by changing an end clock-time from a third clock-time to a fourth clock-time that are clock-times temporally after the start clock-time.

12. The non-transitory recording medium of claim 9, wherein a candidate segment determined as being the target action series is extracted as a processing target action series.

* * * * *